United States Patent

Korzenski et al.

[11] 4,035,347
[45] July 12, 1977

[54] METHOD FOR THE PREPARATION OF DRIED LATEX POLYMER FROM AQUEOUS EMULSION

[75] Inventors: David B. Korzenski, Dunkirk, N.Y.; Barney Vallino, Jr., Homewood; Wayne E. Zarnecki, Mokena, both of Ill.

[73] Assignee: Nalco Chemical Company, Oak Brook, Ill.

[21] Appl. No.: 663,010

[22] Filed: Mar. 2, 1976

Related U.S. Application Data

[63] Continuation-in-part of Ser. No. 504,064, Sept. 9, 1974, abandoned, which is a continuation of Ser. No. 305,206, Nov. 9, 1972, abandoned.

[51] Int. Cl.² .......... C08F 1/13; C08F 3/90; C08F 15/02
[52] U.S. Cl. .......... 260/79.3 MU; 526/207; 526/209; 526/240; 526/303; 526/312; 526/909
[58] Field of Search .......... 526/209, 207, 225, 303, 526/911; 260/79.3 MU, 29.6 H, 29.6 SQ

[56] References Cited

U.S. PATENT DOCUMENTS

| | | | |
|---|---|---|---|
| 3,058,958 | 10/1962 | Glavis | 526/240 X |
| 3,284,393 | 11/1966 | Vanderhoff | 526/207 |
| 3,624,019 | 11/1971 | Anderson | 260/29.6 H |
| 3,732,193 | 5/1973 | Svarz | 260/79.3 MU |
| 3,767,629 | 10/1973 | Vallino | 526/235 |
| 3,826,771 | 7/1974 | Anderson | 260/29.6 |

Primary Examiner—Christopher A. Henderson
Attorney, Agent, or Firm—John G. Premo; Robert A. Miller; Barry W. Sufrin

[57] ABSTRACT

A method for preparing substantially dry homopolymers and copolymers which comprises forming a polymeric latex or water-in-oil emulsion and partially inverting said latex by regulated contact time with water in the time span 0.5 – 10.0 seconds and preferably less than 1 second. A preferred operation is carried out in a static mixer where the contact time for inversion is regulated by the diameter or length of a cylindrical tube containing static baffles.

7 Claims, 3 Drawing Figures 4,035,347

METHOD FOR THE PREPARATION OF DRIED LATEX POLYMER FROM AQUEOUS EMULSION

This application is a continuation in part of copending application Ser. No. 504,064 filed Sept. 9, 1974, which was a continuation of application Ser No. 305,206 filed Nov. 9, 1972, both now abandoned.

INTRODUCTION

It is now known that water-soluble ethylenic-unsaturated monomers may be polymerized by a water-in-oil emulsion polymerization process to produce a polymeric latex. These latices may be characterized as being a water-in-oil emulsion which contains dispersed therein a finely divided water-soluble vinyl addition polymer.

Latices of the type described above and their method of manufacture are described in U.S. Pat. No. 3,284,393 Vanderhoff et al. The polymeric latices produced by the polymerization method set forth in this patent are unstable under long term storage conditions. These polymeric latices tend to precipitate the polymer therefrom at room temperature over a period of time ranging between a few hours up to several days. Due to the instability of these latices the polymers produced by the above-mentioned process are removed from the water-in-oil emulsion in which they are contained by precipitation or sedimentation techniques to produce a dry form polymer.

Figure 1:
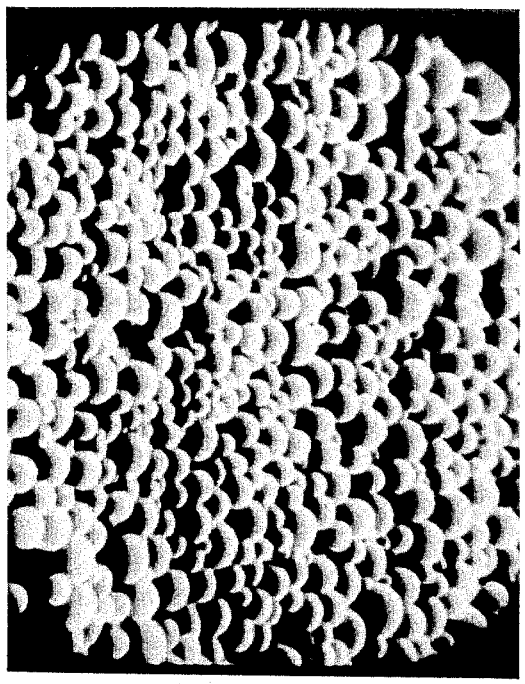
FIG. 1 illustrates such a prior art polymer which has been alcohol precipitated and dried and illustrates a non-inverted type polymer. The average particle size of the spherical particles is about 1–2 microns.

The dry polymers, as in FIG. 1 above which is non-inverted, have several serious disadvantages. First, the polymer particles, when precipitated, tend to coalesce to form large chunks of polymer which then must be dried. The drying step must be performed at a temperature sufficient to dry not only the outer surface of these polymer chunks, but also the inner portions. To do this, oftentimes excessively high temperatures and long drying periods must be used.

After the drying step has been completed, it is necessary to grind the polymer mass into a powder which is suitable for dissolution in water. Generally, the polymer mass is ground to a particle size of from 10 to 40 mesh. A dusting problem exists in that fines escape, resulting in product loss as well as creating pollution in the air.

Thirdly, probably the most important factor is that products made by this procedure are quite difficult to dissolve. It has been found that a polymer product made by the patented process takes from 1 to 2 hours to dissolve in solution under plant conditions. Typical dissolution conditions are adding dry polymer to a vessel containing 100 gallons of water with mixing at a speed of 2000 rpm. It would be advantageous to provide a polymer which avoided these three problems.

OBJECTS

An object of this invention is to provide a method for making substantially dry homo polymers and copolymers of water-soluble ethylenic-unsaturated monomers.

Another object of this invention is to provide a method for making substantially dry homo polymers and copolymers in which the drying step can be simplified and shortened.

A further object of this invention is to provide a method for making substantially dry homo polymers and copolymers of water-soluble ethylenic-unsaturated monomers in which dusting may be avoided.

Still another object of this invention is to provide a method for making substantially dry homo polymers and copolymers of water-soluble ethylenic-unsaturated monomers which have a fast rate of dissolution in water.

Other objects will appear hereinafter.

THE INVENTION

Polymers and copolymers of water-soluble ethylenic-unsaturated monomers having the desired improved properties as described above may be produced by the steps of:

A. Preparing a water-in-oil emulsion which contains dispersed therein a finely divided water-soluble vinyl addition polymer;

B. Contacting the emulsion of step (A) with water for a time period of 0.5 – 10.0 seconds and which contains dispersed therein from 0.1 to 10.0% by weight based on polymer of a water-soluble surfactant to provide a partially inverted emulsion;

C. Casting the partially inverted emulsion of step (B) upon a surface to form a thin film;

D. Heating the film of the partially inverted emulsion to provide a dry film polymer product; and E. Recovering the dry film polymer product.

Figure 2:
FIG. 2 illustrates dried latex which has been partially inverted according to the practice of the present invention. Note the presence of a substantial amount of spherical particles in the photomicrograph.

The partially inverted polymer prepared according to the method of this invention is illustrated in FIG. 2. It can be noted from FIG. 2 that the particles are largely loosely agglomerated amorphous mass but with some spherical particles (0.05 to 5.0 microns).

The water-in-oil emulsion which contains dispersed therein a finely divided water-soluble vinyl addition polymer may be prepared according to the disclosure of U.S. Pat. No. 3,624,019 Anderson et al. and U.S. Pat. No. 3,826,771 Anderson et al.

The process referred to in the above two patents involves the formation of an emulsion by the addition of a monomer phase to an oil phase containing an emulsifying agent. The monomer phase is comprised of a water-soluble ethylenic unsaturated monomer in an aqueous solution. The aqueous phase concentration may range from 75 to 95% by weight of the emulsion. The oil phase is any inert hydrophobic liquid such as hydrocarbons and substituted hydrocarbons. The inert hydrophobic liquid concentration ranges from about 5 to 25% by weight of the emulsion. An emulsifying agent which is oil soluble is present in amounts from 0.1–15%. A preferred formulation is 75–95% aqueous phase, 4–24% hydrophobic liquid, and about 1% emulsifier.

In the above prior art patents, U.S. Pat. No. 3,826,771 Anderson et al. is, as stated, directed to a high concentration of the monomer phase in the water-in-oil emulsion where a monomer phase is defined as monomer plus water. The main problem in processing resultant polymers from the processes of the above patents is that, if the products are not inverted, processing to a drum drier leads to a powder which is unusable commercially. On the other hand, if the products are completely inverted, the result is that a rubbery mass forms which clings to the drum and prevents any commercial product. It was found that, in addition, the lower polymer levels usually contemplated by Anderson et al. U.S. Pat. No. 3,624,019, even if processed through the drum, led to wastage in shipping costs brought about by the amount of water carried in the polymer.

The present invention strikes a balance between the completely non-inverted product of a water-in-oil emulsion and the wholly inverted resultant dilute oil-in-water solution.

In summary, the purpose of the present invention is to maximize the solids and conserve the amount of water without producing a rubbery mass and getting an unusual product which cannot be dried on a drum. This has been found to be achievable by partial inversion of the product where water contact time with the latex or water-in-oil emulsion is regulated between 0.5 seconds and 10.0 seconds. One preferred method of achieving the correct contact time is by use of a static mixer, conveniently a Kenics Static Mixer where water and latex are separately metered into a common mixing zone. This mixing zone is a rectangular tube with static baffles and by varying the diameter of the bore of the tube or the length of the tube, it is possible to control the time of contact of the latex with water. It has been further found that a time from 0.5 – 10.0 seconds gives a product which is partially inverted from a water-in-oil emulsion to an oil-in-water emulsion, and within this range, there is produced a polymeric substance which will stick on the drum and adequately release from said drum. The largely amorphous material is further picturized in FIG. 2, which additionally shows some of the spherical particles noted predominantly in the noninverted material of FIG. 1. A preferred contact time is less than 1 second.

All known polymerizable water-soluble ethylenic unsaturated monomers, the polymers of which are insoluble in the continuous oil phase, can be polymerized by a water-in-oil emulsion polymerization process to give a polymeric latex. Such monomers have a water solubility of at least 5 weight percent and include acrylamide, methacrylamide, acrylic acid, methacrylic acid, vinylbenzyl dimethylammonium chloride, alkali metal and ammonium salts of a 2-sulfoethylacrylate, sodium styrene sulfonate, 2-aminoethylmethacrylate hydrochloride, alkali metal and ammonium salts of vinylbenzyl sulfonates and the like. When aqueous solutions of the monomers are used, they can be varied widely in monomer content.

The polymer-containing emulsion of this invention is comprised in an aqueous phase ranging between 75 and 95% by weight of the emulsion. The aqueous phase is defined as a sum of polymer or copolymer and the water present in the composition. The preferred range is between 75 and 90% by weight of the emulsion. The most preferred range is between 75 and 80% by weight of the emulsion.

The present invention has a polymer concentration between 20 and 50% by weight of the emulsion. A preferred range is between 25 and 40% by weight of the emulsion. The most preferred range is between 30 and 35% by weight of the emulsion.

In order to emulsify the monomer phase into the oil phase to give a water-in-oil emulsion, an emulsifying agent of the water-in-oil type is used in amount ranging between 0.1 and 15% by weight of the emulsion, with a most preferred range of 1–5%. Any conventional water-in-oil emulsifying agent can be used, such as hexadecyl sodium phthalate, sorbitan monooleate, sorbitan monostearate, cetyl or stearyl sodium phthalate, metal soaps, and the like.

The oil phase can be any inert hydrophobic liquid which can readily be separated from the dispersed phase polymeric product.

A preferred group of organic liquids are the hydrocarbon liquids which include both aromatic and aliphatic compounds. Thus, such organic hydrocarbon liquids as benzene, xylene, toluene, mineral oils, kerosenes, napthas and, in certain instances, petrolatums may be used. A particularly useful oil from the standpoint of its physical and chemical properties is the branch-chain isoparaffinic solvent sold by Humble Oil and Refining Company under the tradename ISOPAR M. Typical specifications of this narrow-cut isoparaffinic solvent are set forth below in Table I:

TABLE I

| Specification Properties | Minimum | Maximum | Test Method |
|---|---|---|---|
| Gravity, API at 60/60° F. | 48.0 | 51.0 | ASTM D 287 |
| Color, Saybolt | 30 | — | ASTM D 156 |
| Aniline point, ° F. | 185 | — | ASTM D 611 |
| Sulfur, ppm | — | 10 | ASTM D 1266 (Nephelometric mod.) |
| Distillation, ° F. | | | |
| IBP | 400 | 410 | |
| Dry Point | — | 495 | |
| Flash point, ° F (Pensky-Martens closed cup) | 160 | — | ASTM D 93 |

Free radical yielding initiators useful in polymerizing ethylenic-unsaturated monomers, such as benzoyl peroxide, lauroyl peroxide, 2,2′ azobis (isobutyronitrile), potassium persulfate and the like are used in the polymerization, advantageously in amounts ranging between 0.02 and 10.0% by weight of the emulsion, depending upon the solubility of the initiator. Polymerization can also be carried out using high energy irradiation, or high energy electrons from a Van de Graaff accelerator, etc., or ultraviolet irradiation.

Elevated reaction temperatures, advantageously between 40° and 70° C., are used with free radical yielding initiators. Within such a temperature range, conversion is substantially complete in from one-half hour to several days, depending upon monomer and reaction variables. High energy or ultraviolet irradiation polymerization is carried out at room temperature or above or below room temperature, as desired.

The process described above may be briefly summarized by the following series of steps:

A. Forming a water-in-oil emulsion from:
1. water which contains dissolved therein a water-soluble ethylenic-unsaturated monomer, thereby producing an aqueous monomer phase which has a concentration of from 75 to 95% by weight of said emulsion;
2. an inert hydrophobic liquid of 4–24% by weight of the emulsion;
3. a water-in-oil emulsifying agent in a concentration of from 0.1 to 15% by weight of the emulsion;
4. a free radical initiator;

B. Heating said emulsion under free radical forming conditions to polymerize the water-soluble ethylenic-unsaturated monomer contained in the emulsion; and C. Polymerizing said monomer in the water-in-oil emulsion to produce a polymeric latex.

The water-in-oil emulsion containing polymer is then contacted with water for a period of 0.1 – 10.0 seconds and preferably less than 1 second. The water contains dispersed therein 0.1 to 10.0% by weight based on polymer of a water-soluble surfactant to provide a partially inverted emulsion. Preferably the water contains 0.1 to 5.0% surfactant, based on polymer. It is desired to add enough water to reduce the solids level of the emulsion to 15 to 25%, preferably 20% by weight. This involves the addition of 30 to 40% by weight of water, based on total emulsion.

As indicated, this process produces a polymeric latex which comprises a water-in-oil emulsion which contains dispersed therein a finely divided water-soluble vinyl addition polymer.

The final partially inverted water-in-oil emulsion composition consists of:
1. an aqueous phase ranging between 75 and 95% by weight of the emulsion;
2. a hydrophobic liquid ranging between 4 and 24% by weight of the emulsion; and
3. a water-in-oil emulsifying agent having a concentration between 0.1 and 15% by weight of the emulsion.

A general method for dissolution of a polymeric latex is taught above in U.S. Pat. No. 3,624,019 Anderson et al. However, in the present invention there is only a partial inversion and this is controlled by a limited contact time with water. The contact time is merely for 0.5 to 10.0 seconds, preferably less than one second. It is not desirable to completely dissolve the polymer in water. This short contact time before the drying step may be effected by various techniques. One particularly efficient method is a Kenics Static Mixer in which the two streams are contacted with good mixing for periods of time as short as one second.

The preferred surfactants are hydrophilic and are further characterized as being water-soluble and are utilized in 0.1 to 10.0 weight percent based on polymer. Any hydrophilic-type surfactant such as ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate; the alkali metal alkyl or alkylene sulfates, such as sodium lauryl sulfate, potassium stearyl sulfate; the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of high means like lauryl amine hydrochloride and stearyl amine hydrobromide.

Any anionic, cationic, or nonionic compound can be used as the surfactant.

The preferred method of drying is by casting the polymeric latex upon a heated surface to form a thin film. It must be recognized that the drying variables, such as drying temperature, film thickness, and drying time are all interrelated and, as a result, each is dependent on the other. Each of these variables affects the nature of the drying step. Therefore, it is necessary to determine for each individual polymeric system the optimum drying variables to produce a dry, active product.

The amount of heat needed to dry a particular polymeric latex will depend upon several variables such as solvents used, solvent concentration, ratio of water to oil will affect the drying conditions. Generally, a temperature within the range of 150° to 400° F. is adequate.

It is apparent that, as the thickness of cast film is increased, often there is a decrease in activity and quality of the dry product. Thus, it is quite important to determine the optimum drying temperature and film thickness to avoid this problem. Generally, the optimum film thickness for the specified temperature range is from 0.001 to 0.25 inches.

The most preferred method of drying the polymeric latex is by casting the polymeric latex upon a drum dryer. The rotating drum can be heated by either steam or electrical means. The polymeric latex is continuously cast upon the heated surface of the drum, dried and is removed from the drum surface as a dry product. The dried polymer latex is characterized as being loosely agglomerated amorphous mass containing a number of discrete, substantially spherical particles, wherein said particles have an average particle size range between 0.05 and 5.0 microns.

The dry product has no fines and, as a result, there is no dusting problem. Additionally, since the material consists of discrete spherical particles, there is no need for grinding the dried product. However, the most important and significant aspect is that the dry product dissolves in a 1% water solution within 10 minutes.

EXAMPLES 1 – 11

A series of experiments were performed in which polymeric latices were prepared and then drum dried upon a pilot plant sized unit.

The data and results are tabulated in Table II. It can be observed from the results in Table II that the polymeric latex as dried per this invention shows a dissolution rate in water far superior to that of a dried polymer by a prior art process. Examples 1–8 show that different polymer and copolymer latices dissolve in water within 10 minutes. Examples 9–11 show that a dry polymer which was produced per U.S. Pat. No. 3,284,393 Vanderhoff et al. dissolved in water in from 1 to 1½ hours.

TABLE II

| Test No. | Polymer or Copolymer | Polymer Conc. | Oil | Oil Conc. | Water Conc. | Activator Conc. | Activator | Drum Speed | Drying Temp. | Dissolution Time | Thickness | Moisture |
|---|---|---|---|---|---|---|---|---|---|---|---|---|
| 1 | Acrylamide- | | | | | | | | | | | |

TABLE II-continued

| Test No. | Polymer or Copolymer | Polymer Conc. | Oil | Oil Conc. | Water Conc. | Activator Conc. | Activator | Drum Speed | Drying Temp. | Dissolution Time | Thickness | Moisture |
|---|---|---|---|---|---|---|---|---|---|---|---|---|
| 2 | Acrylic Acid | 35 | Isopar M | 30 | 35 | 4% | 1 | 6 rpm | 325°F | 7 min | 0.001" | 7.5% |
| 3 | Acrylamide-Acrylic Acid | 40 | Isopar M | 30 | 30 | 4% | 1 | 6 rpm | 300°F | 6 min | 0.001" | 7.3% |
| 4 | Acrylamide-Acrylic Acid | 40 | Isopar M | 30 | 30 | — | — | 6 rpm | 300°F | 10 min | 0.001" | 7.9% |
| 5 | Acrylamide-Acrylic Acid | 40 | Isopar M | 30 | 30 | 2% | 2 | 6 rpm | 300°F | 8 min | 0.001" | 6.5% |
| 6 | Acrylamide-DMAEM | 35 | Toluene | 30 | 35 | 4% | 1 | 6 rpm | 325°F | 5.5 min | 0.001" | 7.0% |
| 7 | Sodium Styrene Sulfonate Acrylamide- | 35 | Benzene | 30 | 35 | 2% | 1 | 6 rpm | 325°F | 8 min | 0.001" | 9.0% |
| 8 | Methacrylic Acid | 35 | Isopar M | 30 | 35 | 4% | 2 | 10 rpm | 285°F | 9 min | 0.0005" | 6.5% |
| 9 | Acrylamide | 35 | Kerosene | 30 | 35 | 4% | 1 | 6 rpm | 325°F | 10 min | 0.001" | 8.0% |
| 10 | Acrylamide-Acrylic Acid | 100 | Isopar M | 30 | 35 | — | — | 6 rpm | 325°F | 90 min | — | — |
| 11 | Acrylamide-DMAEM | 100 | Isopar M | 30 | 35 | — | — | 6 rpm | 325°F | 75 min | — | — |
|  | Acrylamide | 100 | Isopar M | 30 | 35 | — | — | 6 rpm | 325°F | 60 min | — | — |

1 = octyl phenol Rx with 3 moles EtO
2 = octyl phenol Rx with 10 moles EtO
DMAEM = Dimethylaminoethyl methacylate

EXAMPLE 12

Calculations of Residence Time for Partial Inversion of Products

A water-in-oil copolymer latex of acrylamide/acrylic acid was prepared in a manner similar to Test Nos. 2–4 of Table II and was then partially inverted according to the following technique.

This copolymer latex was metered into a Kenics Static Mixer at the rate of 1200 cc/min. together with separately added water at 700 cc/min. The ½ inch SS Kenics Static Mixer (21 elements) was 18 inches in length. The calculations between the residence or contact time of the latex with water to achieve partial inversion are set out below:

Total Flow Rate $$(1900 \text{ cm}^3/\text{min}) \left( \frac{0.06102 \text{ in}^3}{\text{cm}^3} \right) = 115.94 \text{ in}^3/\text{min}.$$

$$\text{Linear Velocity} = \frac{\text{Flow Rate}}{\text{Cross Sectional Area}} = \frac{115.9 \text{ in}^3/\text{min}}{\pi r^2_{mixer}}$$

For ½" diameter:

$$= \frac{115.94 \text{ in}^3/\text{min}}{(3.14)(.25)^2}$$
$$= 590.77 \text{ in/min}$$
$$= 9.85 \text{ in/sec}$$

For 18" long:

$$18/9.85 = 1.83 \text{ sec. (residence time)}$$

Calculations of residence time based on other runs utilizing static mixers of different diameters are set out as follows:

⅜" diameter:
17.5 in/sec; 1 sec. (for 18")

¼" diameter:
39.4 in/sec; .3 sec (for 12")

The products of this example uniformly, when passed to a small drum dryer, gave consistently adherent products which showed partial inversion characteristics, indicating that the individual particles making up the largely amorphous agglomerates containing a number of spherical particles from 0.05 – 5.0 microns as shown in FIG. 2.

Figure 3:
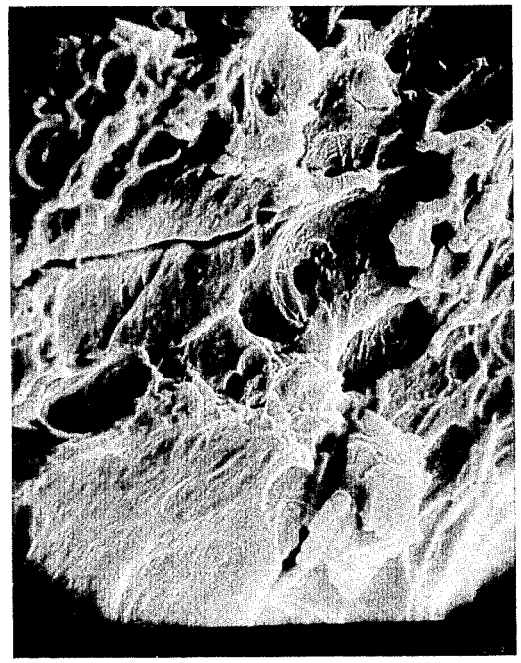
FIG. 3 illustrates a dried latex which is fully inverted and shows no spherical particles remaining in the picture.

These products had advantages over non-inverted products as shown in FIG. 1 in that there was little or no dust problem coming off the drum and also they would adhere to the drum. These products had advantages over totally inverted products such as the prior art indicated in U.S. Pat. No. 3,624,019 Anderson et al., whose flake-type particles were difficult to catch on the drum. The products of the present invention also had advantage over the completely inverted products as shown in FIG. 3 which exhibited the properties of a rubbery mass unusable on the drum.

In the preferred modification utilizing a Kenics Mixer above, it was observed that by varying the diameter upwardly from ½ inch or increasing the number of static baffles within the tube or using longer dimension tubes, the contact or residence time could be increased to about 10 seconds. The best efficiency as to the critical adhesion to the drum during the drying stage was achieved for about 1 second or less. Also, as affecting the drying stage, it was found that a completely non-inverted product gave no adherence to the drum and gave fines trouble. Also, it was found that a completely inverted product gave a rubbery mass which gave an unusable product which could not be drum dried. The present invention, by control of water contact time, gave a product which could be dried on the drum and later utilized. The later utilization of these products showed a maximum elimination of water for transportation cost consideration and one goal of a maximized solids content for shipping purposes had been more nearly approached than in the prior art.

We claim:

1. A method of preparing substantially dry, dust-free, readily soluble homo polymers and copolymers of a water-soluble ethylenic-unsaturated monomer comprising the steps of:
  A. preparing a water-in-oil emulsion which contains dispersed therein a finely divided water-soluble vinyl addition polymer;
  B. contacting said emulsion of step (A) with water for about 0.5 – 10 seconds, said water additionally containing dispersed therein from 0.1 to 10.0% by weight based on polymer of a water-soluble surfactant to provide a partially inverted emulsion;
  C. casting said partially inverted emulsion of step (B) upon a surface to form a thin film;

D. heating said film of the partially inverted emulsion to provide a dry film polymer product; and E. recovering said dry film polymer product.

2. The method of claim 1 wherein the polymeric latex is dried by casting said polymeric latex upon a drum dryer.

3. The method of claim 1 wherein the drying temperature ranges from 150° to 400° F.

4. The method of claim 1 wherein the thickness of the cast film is between 0.001 and 0.25 inches.

5. The method of claim 1 wherein said contact time is less than one second.

6. The method of claim 1 wherein said water-in-oil emulsion comprises:
1. an aqueous phase ranging between 75 and 95% by weight of the emulsion;
2. a hydrophobic liquid ranging between 4 and 24% by weight of the emulsion; and
3. a water-in-oil emulsifying agent having a concentration between 0.1 and 15% by weight of the emulsion.

7. The method of claim 1 wherein said water of step (B) contains dispersed therein from 0.1 to 5.0% by weight based on polymer of a water-soluble surfactant.

* * * * *